US012562138B2

(12) United States Patent
Dai et al.

(10) Patent No.: US 12,562,138 B2
(45) Date of Patent: Feb. 24, 2026

(54) METHOD AND SYSTEM FOR COMPENSATING ANTI-DIZZINESS PREDICTED IN ADVANCE

(71) Applicant: INDUSTRIAL TECHNOLOGY RESEARCH INSTITUTE, Hsinchu (TW)

(72) Inventors: Hong-Ming Dai, Tainan (TW); Ya-Rou Hsu, Tongxiao Township (TW); Chien-Ju Lee, Taoyuan (TW); Chia-Hsun Tu, Taipei (TW); Yu-Hsiang Tsai, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 240 days.

(21) Appl. No.: 18/206,493

(22) Filed: Jun. 6, 2023

(65) Prior Publication Data

US 2024/0312431 A1 Sep. 19, 2024

(30) Foreign Application Priority Data

Mar. 14, 2023 (TW) ................................ 112109321

(51) Int. Cl.
*G09G 5/00* (2006.01)
*G07C 5/04* (2006.01)

(52) U.S. Cl.
CPC ............... *G09G 5/003* (2013.01); *G07C 5/04* (2013.01); *G09G 2340/0471* (2013.01); *G09G 2340/0478* (2013.01); *G09G 2380/10* (2013.01)

(58) Field of Classification Search
None
See application file for complete search history.

(56) References Cited

U.S. PATENT DOCUMENTS 6,763,292 B1 7/2004 Smith et al.
9,145,143 B2 9/2015 D'Amato et al.
(Continued)

FOREIGN PATENT DOCUMENTS

CN 105094310 A 11/2015
CN 106167045 A 11/2016
(Continued)

OTHER PUBLICATIONS

Choi et al., a machine-translated English version of a foreign patent application (KR 102055585 B1) (Year: 2019).*
(Continued)

*Primary Examiner* — Kee M Tung
*Assistant Examiner* — Biao Chen
(74) *Attorney, Agent, or Firm* — Birch, Stewart, Kolasch & Birch, LLP

(57) ABSTRACT

A method and system for compensating anti-dizziness predicted in advance are provided. The method for compensating anti-dizziness predicted in advance includes the following steps. A six-degrees-of-freedom information is obtained. Through using a machine learning model, an attitude prediction compensation information is obtained according to the six-degrees-of-freedom information. A path information is obtained. A path prediction compensation information is obtained according to the path information. A road information is obtained. A road prediction compensation information is obtained according to the road information. A display information is compensated according to the attitude prediction compensation information, the path prediction compensation information, or the road prediction compensation information.

16 Claims, 9 Drawing Sheets

(56) References Cited

U.S. PATENT DOCUMENTS

| | | | | |
|---|---|---|---|---|
| 10,152,882 | B2 | 12/2018 | Zhao et al. | |
| 10,694,078 | B1 * | 6/2020 | Davidsson | B60K 35/85 |
| 10,950,159 | B1 | 3/2021 | Tsai et al. | |
| 11,119,624 | B2 | 9/2021 | Johnson et al. | |
| 11,386,874 | B2 * | 7/2022 | Burkhard | G09G 5/38 |
| 2021/0263154 | A1 * | 8/2021 | Herman | G01S 17/26 |

FOREIGN PATENT DOCUMENTS

| | | | |
|---|---|---|---|
| CN | 106240456 | A | 12/2016 |
| CN | 111654593 | A | 9/2020 |
| CN | 112660044 | A | 4/2021 |
| CN | 114555401 | A | 5/2022 |
| CN | 115151469 | A | 10/2022 |
| KR | 102055585 | B1 * | 12/2019 |
| TW | I469062 | B | 1/2015 |
| TW | 202236083 | A | 9/2022 |
| TW | 202248810 | A | 12/2022 |

OTHER PUBLICATIONS

Taiwanese Office Action and Search Report for Taiwanese Application No. 112109321, dated Oct. 16, 2023.

* cited by examiner

METHOD AND SYSTEM FOR COMPENSATING ANTI-DIZZINESS PREDICTED IN ADVANCE

This application claims the benefit of Taiwan application Serial No. 112109321, filed Mar. 14, 2023, the subject matter of which is incorporated herein by reference.

BACKGROUND

Technical Field

The disclosure relates in general to a method and a system for compensating anti-dizziness, and more particularly to a method and a system for compensating anti-dizziness predicted in advance.

Description of the Related Art

During the travelling process of a mobile vehicle, wobbles are inevitable. When the passenger's brain has already perceived wobbles, but the eyes have not yet received the wobble information, dizziness may easily occur. To achieve an anti-dizziness effect, the display information displayed on a mobile vehicle display can be processed with wobble compensation, so that the visual wobble perception and the brain wobble perception may be synchronized, and dizziness may be reduced.

However, the calculation of wobble compensation is extremely complicated. During the travelling process of the mobile vehicle, wobble conditions are ever changing, and the calculation of wobble compensation can hardly be completed timely, making the anti-dizziness effect greatly reduced.

SUMMARY

According to one embodiment of the present disclosure, a method for compensating anti-dizziness predicted in advance is provided. The method is adaptable to mobile vehicle and includes the following steps. A six-degrees-of-freedom information is obtained. Through using a machine learning model, an attitude prediction compensation information is obtained according to the six-degrees-of-freedom information. A path information is obtained. A path prediction compensation information is obtained according to the path information. A road information is obtained. A road prediction compensation information is obtained according to the road information. A display information is compensated according to the attitude prediction compensation information, the path prediction compensation information, or the road prediction compensation information.

According to another embodiment of the present disclosure, a system for compensating anti-dizziness predicted in advance is provided. The anti-dizziness compensation system is adaptable to a mobile vehicle and includes a degrees-of-freedom sensing unit, an attitude prediction compensation unit, a path estimation unit, a path prediction compensation unit, a road detection unit, a road prediction compensation unit and a compensation unit. The degrees-of-freedom sensing unit is configured to obtain a six-degrees-of-freedom information. The attitude prediction compensation unit includes at least one machine learning model and an information predictor. Through using the machine learning model, the information predictor obtains an attitude prediction compensation information according to the six-degrees-of-freedom information. The path estimation unit is configured to obtain a path information. The path prediction compensation unit is configured to obtain a path prediction compensation information according to the path information. The road detection unit is configured to obtain a road information. The road prediction compensation unit is configured to obtain a road prediction compensation information according to the road information. The compensation unit is configured to compensate a display information according to the attitude prediction compensation information, the path prediction compensation information, or the road prediction compensation information.

The above and other aspects of the disclosure will become better understood with regard to the following detailed description of the non-limiting embodiment(s). The following description is made with reference to the accompanying drawings.

DETAILED DESCRIPTION

Figure 1:
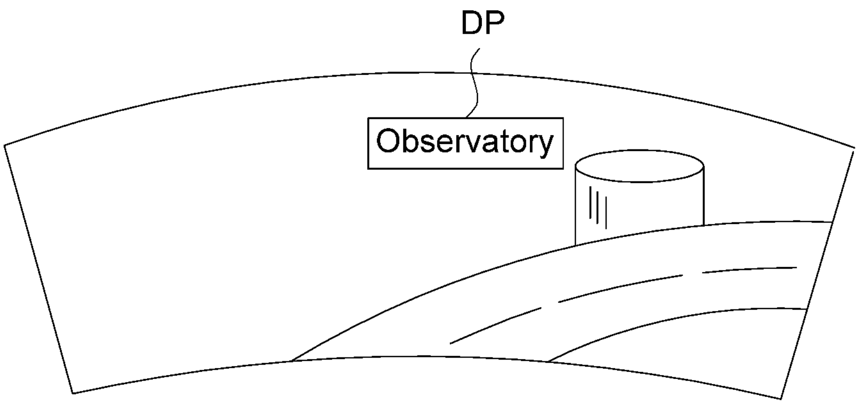
FIG. 1 is a schematic diagram of a display information displayed on a mobile vehicle display according to an embodiment.

Referring to FIG. 1, a schematic diagram of a display information DP displayed on a mobile vehicle display according to an embodiment is shown. FIG. 1 is exemplified by a front window screen of a car. In another embodiment, the technologies of the present disclosure can be used in the window screen of various mobile vehicles. The display information DP can be the introduction of a building or the information of a speedometer. When the mobile vehicle wobbles, the display information DP can be processed with wobble compensation, so that the visual wobble perception and the brain wobble perception can be synchronized, and dizziness can be reduced. In the present disclosure, several predictive compensation technologies are provided. Before the mobile vehicle wobbles, compensation is calculated in advance, so that compensation calculation of the display information DP can be completed timely, and the anti-dizziness effect can be enhanced. Various compensation technologies are disclosed below with a number of exemplary but non-limiting embodiments.

Figure 2:
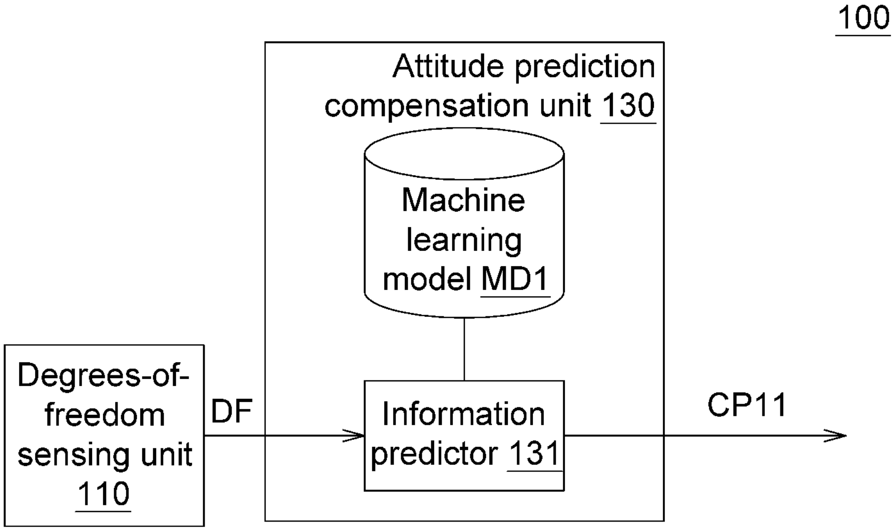
FIG. 2 is a block diagram of a system for compensating anti-dizziness predicted in advance according to an embodiment.
Figure 3:
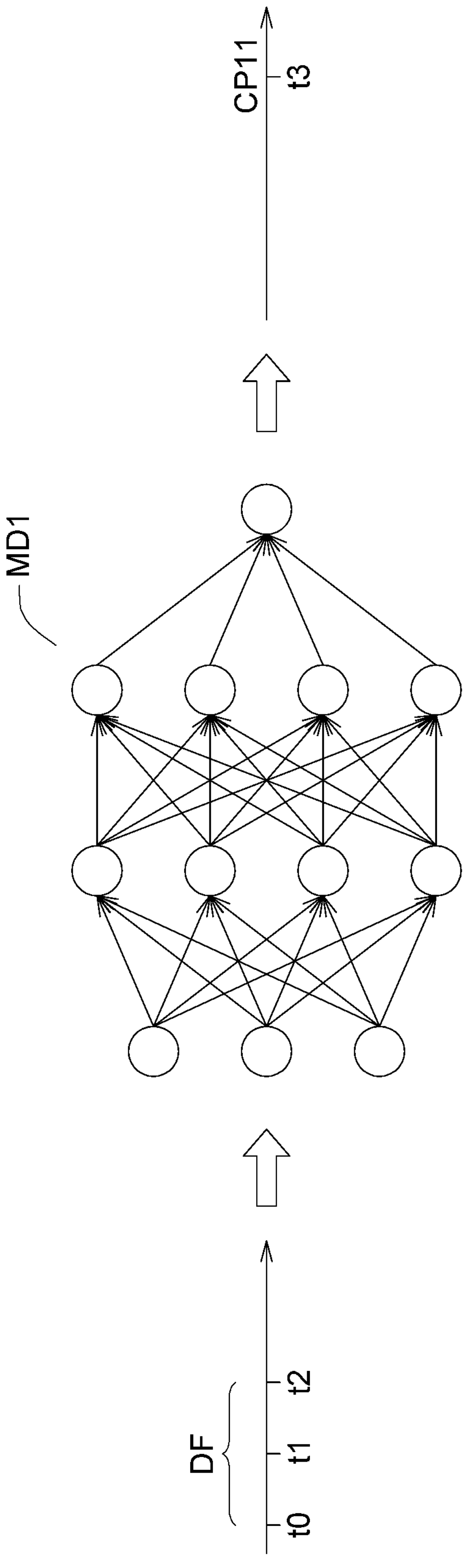
FIG. 3 illustrates an example of a machine learning model.

Referring to FIG. 2, a block diagram of a system for compensating anti-dizziness predicted in advance 100 according to an embodiment is shown. The anti-dizziness compensation system 100 includes a degrees-of-freedom sensing unit 110 and an attitude prediction compensation unit 130. The degrees-of-freedom sensing unit 110 is configured to obtain a six-degrees-of-freedom information DF. The degrees-of-freedom sensing unit 110 can be realized by such as a gyroscope, an accelerometer or a combination thereof. The attitude prediction compensation unit 130 includes an information predictor 131 and a machine learning model MD1. Through using the machine learning model MD1, the information predictor 131 is configured to obtain an attitude prediction compensation information CP11 according to the six-degrees-of-freedom information DF, wherein the attitude prediction compensation information CP11 can be used to predict compensation or attitude. The attitude prediction compensation unit 130 can be realized by such as a circuit, a chip, a circuit board, a computer program product, a program code or a storage device for storing program code or other suitable electronic devices. Referring to FIG. 3, an example of a machine learning model MD1 is illustrated. The six-degrees-of-freedom information DF is obtained from a number of past time points t0, t1 and t2, and the attitude prediction compensation information CP11 corresponds to single future time point t3. The six-degrees-of-freedom information DF is such as the instant state or changes of forward direction, backward direction, vertical direction, horizontal direction, pitch angle, yaw angle and roll angle. During model building, the machine learning model MD1 can use the six-degrees-of-freedom information DF at the 3 past time points as training data and use the due compensation of the fourth time point as ground true value for training purpose. The attitude prediction compensation information CP11 estimated through using the machine learning model MD1 can be the number of pixels that need to be translated horizontally or vertically on the transparent display of the front window screen. Before the time point t3 arrives, the attitude prediction compensation information CP11 is already estimated, so that the display information DP (illustrated in FIG. 1) can be compensated timely to enhance the anti-dizziness effect.

Figure 4:
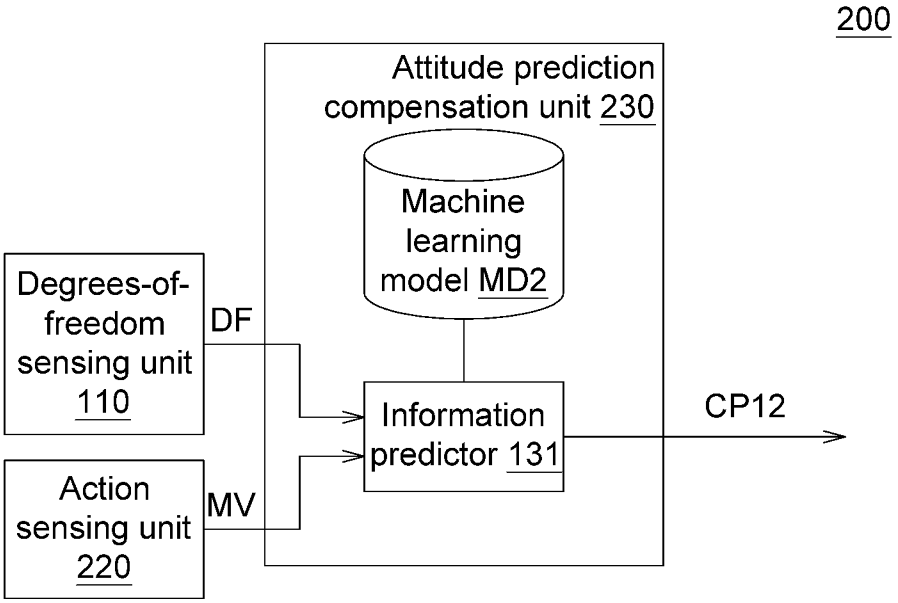
FIG. 4 is a block diagram of a system for compensating anti-dizziness predicted in advance according to another embodiment.
Figure 5:
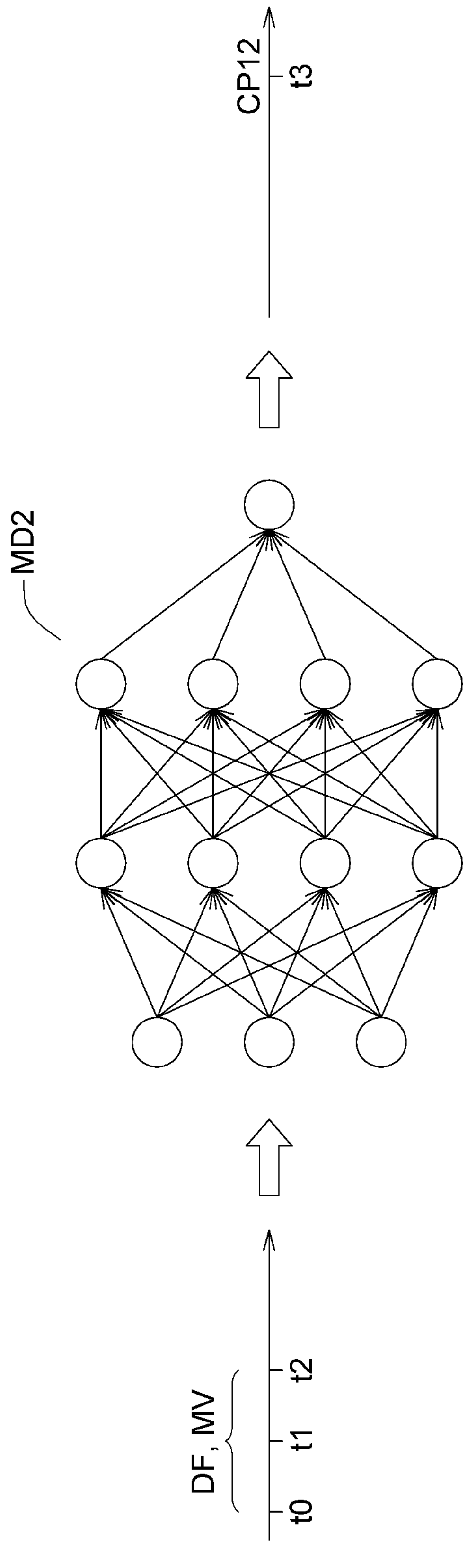
FIG. 5 illustrates an example of a machine learning model.

Referring to FIG. 4, a block diagram of a system for compensating anti-dizziness predicted in advance 200 according to another embodiment is shown. The anti-dizziness compensation system 200 includes a degrees-of-freedom sensing unit 110, an action sensing unit 220 and an attitude prediction compensation unit 230. The action sensing unit 220 is configured to obtain a mobile vehicle action information MV. The action sensing unit 220 can be realized by such as a power detector, a pedal detector, a tire detector or a combination thereof. Through using a machine learning model MD2, the information predictor 131 obtains an attitude prediction compensation information CP12 according to the six-degrees-of-freedom information DF and the mobile vehicle action information MV. Referring to FIG. 5, an example of a machine learning model MD2 is illustrated. The six-degrees-of-freedom information DF and the mobile vehicle action information MV are obtained from a number of past time points t0, t1 and t2, and the attitude prediction compensation information CP12 corresponds to single future time point t3. The mobile vehicle action information MV includes the instant state or changes of the brake hitting information, the travelling speed information and the accelerator hitting information. During model building, the machine learning model MD2 uses the six-degrees-of-freedom information DF at the 3 past time points and the mobile vehicle action information MV as training data and uses the due compensation of the fourth time point as the ground true value for training purpose. The attitude prediction compensation information CP12 estimated through using the machine learning model MD2 can be the number of pixels that need to be translated horizontally or vertically on the transparent display of the front window screen. Before the time point t3 arrives, the attitude prediction compensation information CP12 is already estimated, so that the display information DP (illustrated in FIG. 1) can be compensated timely to enhance the anti-dizziness effect.

Figure 6:
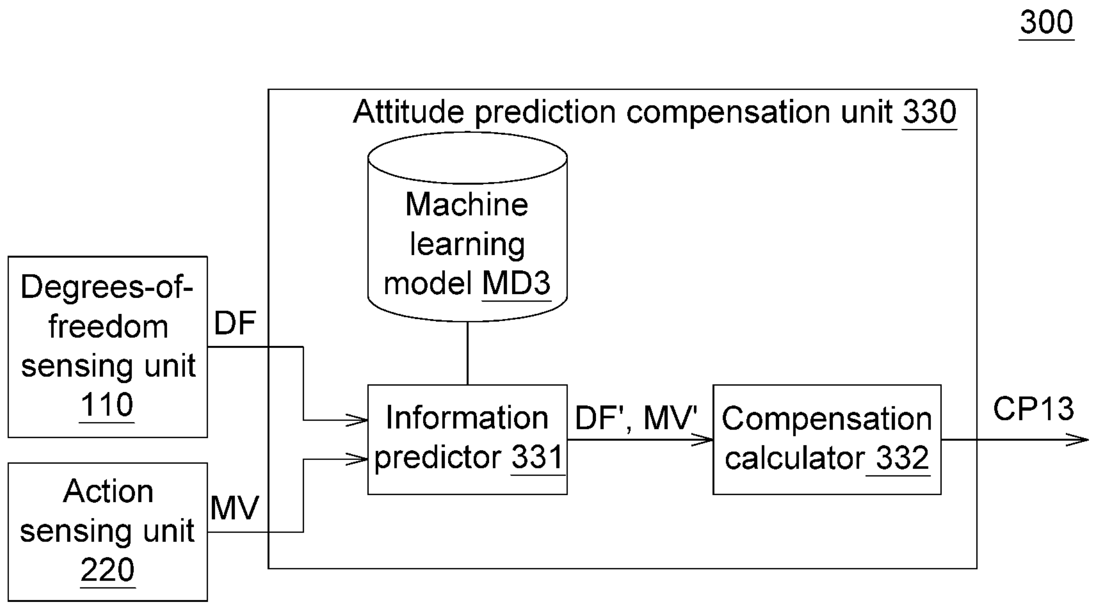
FIG. 6 is a block diagram of a system for compensating anti-dizziness predicted in advance according to another embodiment.

Referring to FIG. 6, a block diagram of a system for compensating anti-dizziness predicted in advance 300 according to another embodiment is shown. The attitude prediction compensation unit 330 of the anti-dizziness compensation system 300 includes an information predictor 331, a compensation calculator 332 and a machine learning model MD3. During model building, the machine learning model MD3 uses the attitude information at different time points for training purpose. Through using the machine learning model MD3, the information predictor 331 can obtain a six-degrees-of-freedom information DF' at a future time point and a mobile vehicle action information MV' at the future time point according to the six-degrees-of-freedom information DF at a past time point and the mobile vehicle action information MV at the past time point. The compensation calculator 332 is configured to calculate the attitude prediction compensation information CP13 according to the six-degrees-of-freedom information DF' at the future time point and the mobile vehicle action information MV' at the future time point.

The attitude prediction compensation information CP13 is calculated according to formula (1).

$$\begin{cases} A_x = DF'_x * S_x + MV'_x + [D_x * DF'_{yaw} * \left(\frac{rs}{wd}\right)] \\ A_y = DF'_y * S_y + MV'_y + \left[D_z * DF'_{roll} * \left(\frac{rs}{wd}\right)\right] + [D_x * DF'_{pitch} * \left(\frac{rs}{wd}\right)] \end{cases} \quad (1)$$

Wherein $A_x$ represents a horizontal compensation information, $DF'_x$ represents a horizontal movement information at the future time point, $S_x$ represents a horizontal vibration sensitivity, $MV'_x$ represents a horizontal mobile vehicle action information at the future time point, $D_x$ represents a horizontal center distance between the degrees-of-freedom sensing unit 110 and the transparent display on the window screen of the mobile vehicle, $DF'_{yaw}$ represents a yaw angle at the future time point, rs represents a resolution of the transparent display on the window screen of the mobile vehicle, and wd represents a width of the transparent display on the window screen of the mobile vehicle. $A_y$ represents a vertical compensation information, $DF'_y$ represents a vertical movement information at the future time point, $S_y$ represents a vertical vibration sensitivity, $MV'_y$ represents a vertical mobile vehicle action information at the future time point, $D_z$ represents a vertical center distance between the degrees-of-freedom sensing unit 110 and transparent display on the window screen of the mobile vehicle, $DF'_{roll}$ represents a roll angle at the future time point, and $DF'_{pitch}$ represents a pitch angle at the future time point.

Through the prediction procedure and the calculation procedure disclosed above, before the time point t3 arrives, the attitude prediction compensation information CP13 is already estimated, so that the display information DP (illustrated in FIG. 1) can be compensated timely to enhance the anti-dizziness effect.

Figure 7:
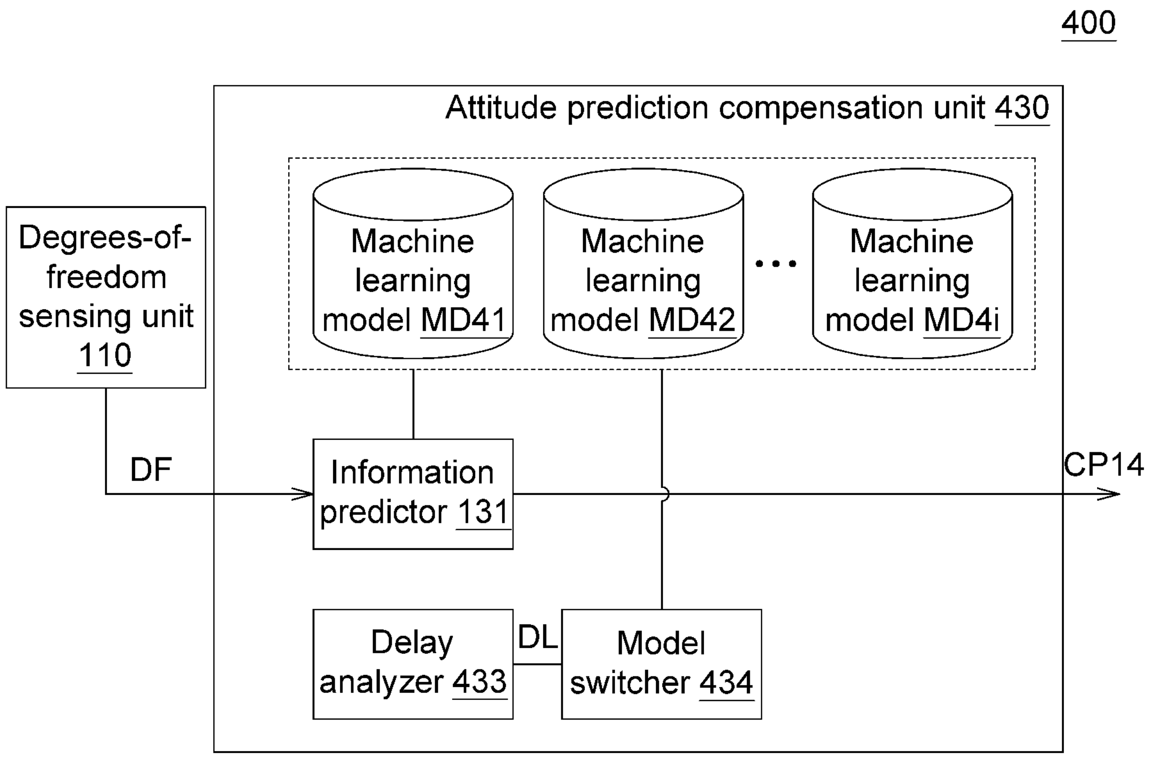
FIG. 7 is a block diagram of a system for compensating anti-dizziness predicted in advance according to another embodiment.

Referring to FIG. 7, a block diagram of a system for compensating anti-dizziness predicted in advance 400 according to another embodiment is shown. The attitude prediction compensation unit 430 includes an information predictor 131, a delay analyzer 433, a model switcher 434 and a number of a machine learning models MD41, MD42, . . . , MD4*i*. The delay analyzer 433 is configured to obtain a system delay information DL. The model switcher 434 is configured to switch to the machine learning model MD41, MD42, . . . , or MD4*i* according to the system delay information DL. The machine learning models MD41, MD42, . . . , and MD4*i* can be trained using different training data. There is a lead time gap between the training data and the attitude prediction compensation information CP14. The model switcher 434 selects one of the machine learning models MD41, MD42, . . . , and MD4*i* whose lead time gap is compatible with the system delay information DL, so that the attitude prediction compensation information CP14 can be compensated according to the display information DP (illustrated in FIG. 1) timely to enhance the anti-dizziness effect.

Figure 8:
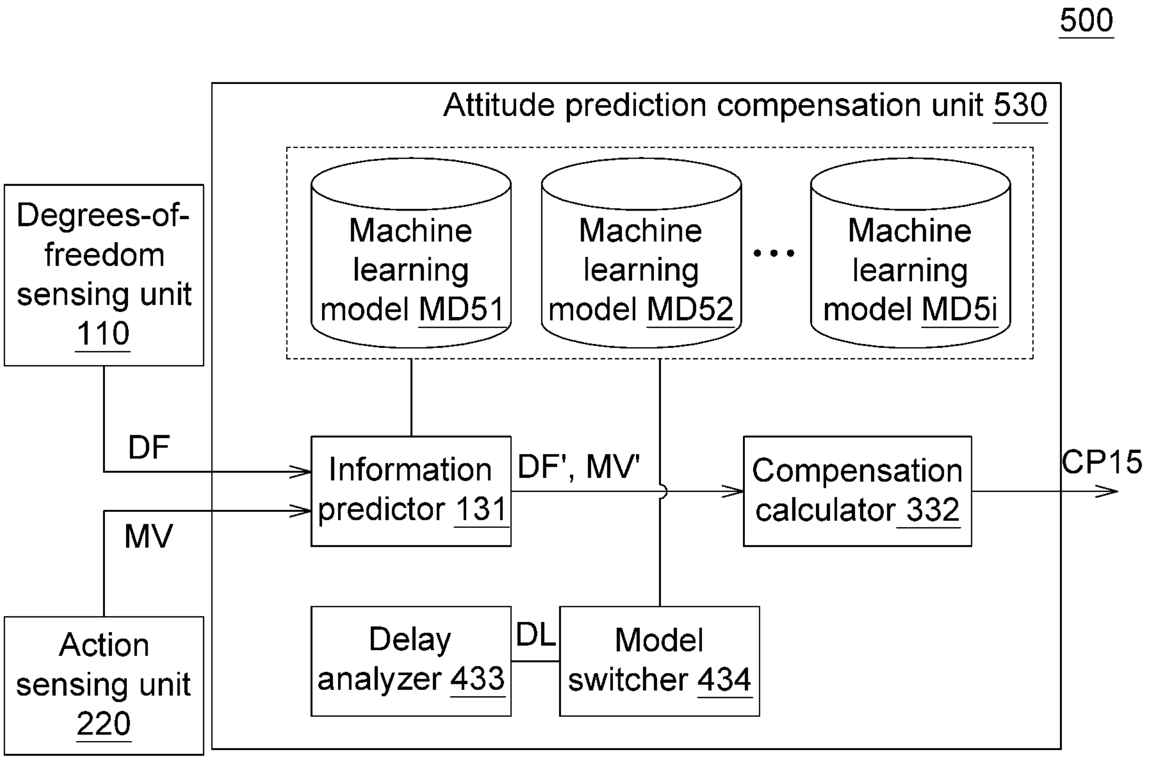
FIG. 8 is a block diagram of a system for compensating anti-dizziness predicted in advance according to another embodiment.

Referring to FIG. 8, a block diagram of a system for compensating anti-dizziness predicted in advance 500 according to another embodiment is shown. The attitude prediction compensation unit 530 includes an information predictor 131, the compensation calculator 332, the delay analyzer 433, the model switcher 434 and a number of machine learning models MD51, MD52, . . . , and MD5*i*. The delay analyzer 433 is configured to obtain a system delay information DL. The model switcher 434 is configured to switch the machine learning model into the machine learning model MD51, MD52, . . . , or MD5*i* according to the system delay information DL. The machine learning model MD5*i* can be trained using different training data. There is a lead time gap between the training data and the six-degrees-of-freedom information DF' at the future time point and the mobile vehicle action information MV' at the future time point. The model switcher 434 selects one of the machine learning models MD51, MD52, . . . , and MD5*i* whose lead time gap is compatible with the system delay information DL, so that the six-degrees-of-freedom information DF' at the future time point and the mobile vehicle action information MV' at the future time point can be provided for the compensation calculator 332 to calculate the attitude prediction compensation information CP15 timely and compensate the display information DP (illustrated in FIG. 1) to enhance the anti-dizziness effect.

Figure 9:
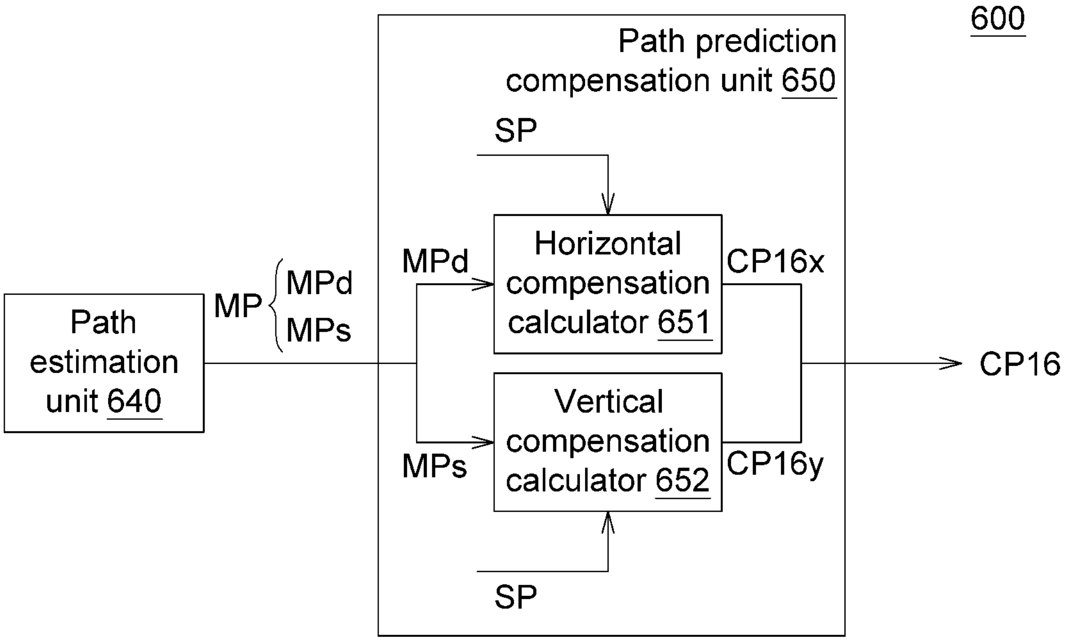
FIG. 9 is a block diagram of a system for compensating anti-dizziness predicted in advance according to another embodiment.

Referring to FIG. 9, a block diagram of a system for compensating anti-dizziness predicted in advance 600 according to another embodiment is shown. The anti-dizziness compensation system 600 includes a path estimation unit 640 and a path prediction compensation unit 650. The path prediction compensation unit 650 may include a horizontal compensation calculator 651 and a vertical compensation calculator 652. The path estimation unit 640 is configured to obtain a path information MP. The path information MP may include a travelling direction information MPd and an uphill-and-downhill information MPs. The horizontal compensation calculator 651 is configured to calculate a horizontal compensation information CP16*x* according to the travelling speed information SP and the travelling direction information MPd. The vertical compensation calculator 652 is configured to calculate a vertical compensation information CP16*y* according to the travelling speed information SP and the uphill-and-downhill information MPs. The path estimation unit 640, the horizontal compensation calculator 651 or the vertical compensation calculator 652 can be realized by such as a circuit, a chip, a circuit board, a program code, a computer program product, a storage device for storing program code or other applicable electronic devices. The horizontal compensation information CP16*x* and the vertical compensation information CP16*y* are calculated according to formula (2).

$$B_x = SP * \frac{\sin\left[\frac{\theta}{\left[\frac{L1+L2}{SP}\right]}\right]}{Cf} * (rs/wd)$$
$$B_y = SP * \frac{SL\ \%}{Cf} * (rs/wd) \tag{2}$$

Figure 10:
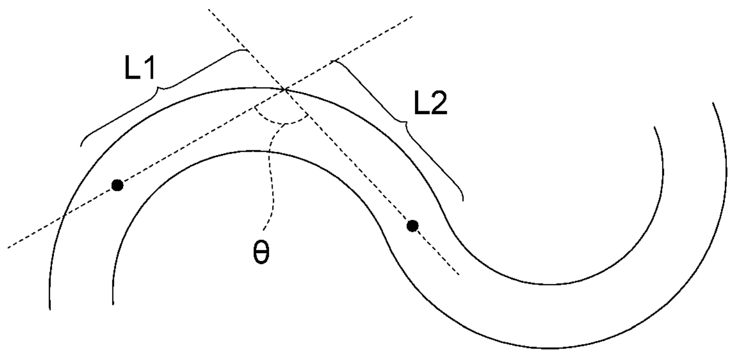
FIG. 10 illustrates the symbols of formula (2).

Referring to FIG. 10, symbols of formula (2) are illustrated. $B_x$ represents a horizontal compensation information, SP represents a travelling speed, θ represents a cornering angle, L1 represents a cornering straight line distance, L2 represents a cornering horizontal distance, Cf represents a compensation frequency, rs represents a resolution of a transparent display, wd represents a width of a transparent display.

In formula (2), the cornering time is calculated according to $$\frac{L1+L2}{SP}.$$

Then, the cornering angle per second is calculated according to $$\frac{\theta}{\left[\frac{L1+L2}{SP}\right]}.$$

Then, horizontal displacement per second is calculated according to $$SP * \sin\left[\frac{\theta}{\left[\frac{L1+L2}{SP}\right]}\right].$$

The due compensation each time is calculated according to $$SP * \frac{\sin\left[\frac{\theta}{\left[\frac{L1+L2}{SP}\right]}\right]}{Cf}.$$

rs/wd is configured to convert the due compensation into pixels of the transparent display.

$B_y$ represents a vertical compensation information, SP represents a travelling speed, SL represents a slope, Cf represents a compensation frequency, rs represents a resolution of a transparent display, wd represents a width of a transparent display.

In formula (2), the ascending height per second is calculated according to SP*SL %. Then, the due compensation each time is calculated according to $$SP*\frac{SL\ \%}{Cf}.$$

rs/wd is configured to convert the due compensation into pixels of a transparent display.

The path prediction compensation information CP16 can be formed of the horizontal compensation information CP16*x* and the vertical compensation information CP16*y*. Through the prediction procedure and the calculation procedure disclosed above, the path prediction compensation information CP16 can be estimated, so that the display information DP (illustrated in FIG. 1) can be compensated timely to enhance the anti-dizziness effect.

Figure 11:
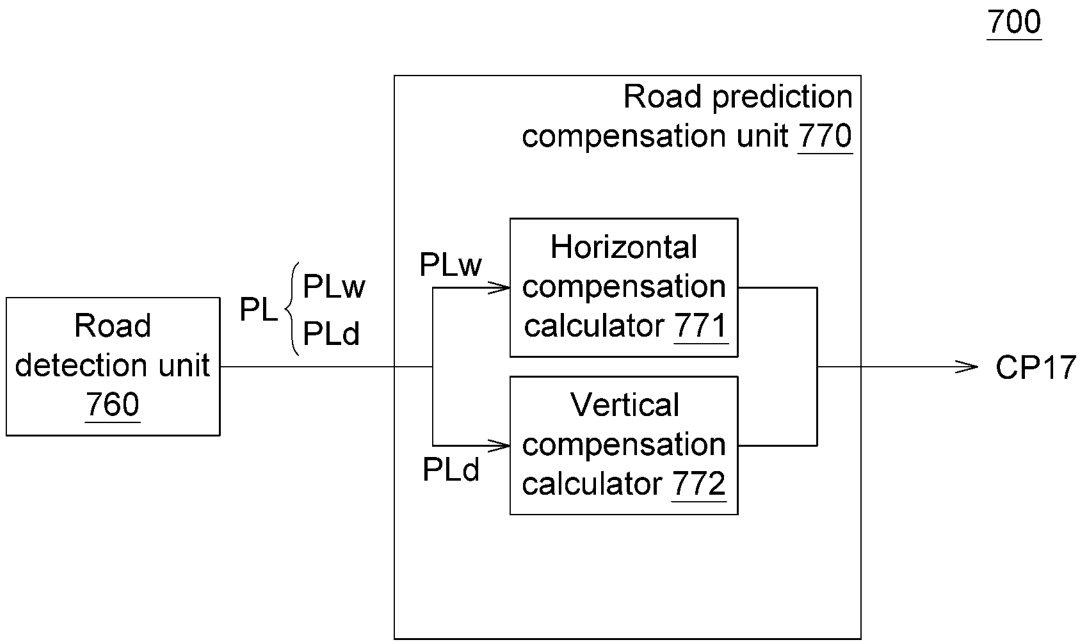
FIG. 11 is a block diagram of a system for compensating anti-dizziness predicted in advance according to another embodiment.

Referring to FIG. 11, a block diagram of a system for compensating anti-dizziness predicted in advance 700 according to another embodiment is shown. The anti-dizziness compensation system 700 includes a road detection unit 760 and a road prediction compensation unit 770. The road detection unit 760 is configured to obtain a road information PL. The road detection unit 760 can be realized by such as a circuit, a chip, a circuit board, a program code, a computer program product, a storage device for storing program code or other applicable electronic devices. The road information PL may include a pothole width information PLw and a pothole depth information PLd.

The horizontal compensation calculator 771 is configured to calculate a horizontal compensation information CP17*x* according to the pothole width information PLw. The vertical compensation calculator 772 is configured to calculate a vertical compensation information CP17*y* according to the pothole depth information PLd. The horizontal compensation calculator 771 and the vertical compensation calculator 772 can be realized by such as a circuit, a chip, a circuit board, a program code, a computer program product, a storage device for storing program code or other applicable electronic devices. The horizontal compensation information CP17*x* and the vertical compensation information CP17*y* can be calculated according to formula (3).

$$\begin{aligned} C_x &= \frac{PLw}{2}*(rs/wd) \\ C_y &= PLd*(rs/wd) \end{aligned} \tag{3}$$

Wherein, $C_x$ represents a horizontal compensation information, PLw represents a pothole width information, rs represents a resolution of a transparent display, wd represents a width of a transparent display, $C_y$ represents a vertical compensation information, PLd represents a pothole depth information.

The road prediction compensation information CP17 can be formed of the horizontal compensation information CP17*x* and the vertical compensation information CP17*y*. Through the prediction procedure and the calculation procedure disclosed above, the road prediction compensation information CP17 can be estimated, so that the display information DP (illustrated in FIG. 1) can be compensated timely to enhance the anti-dizziness effect.

Figure 12:
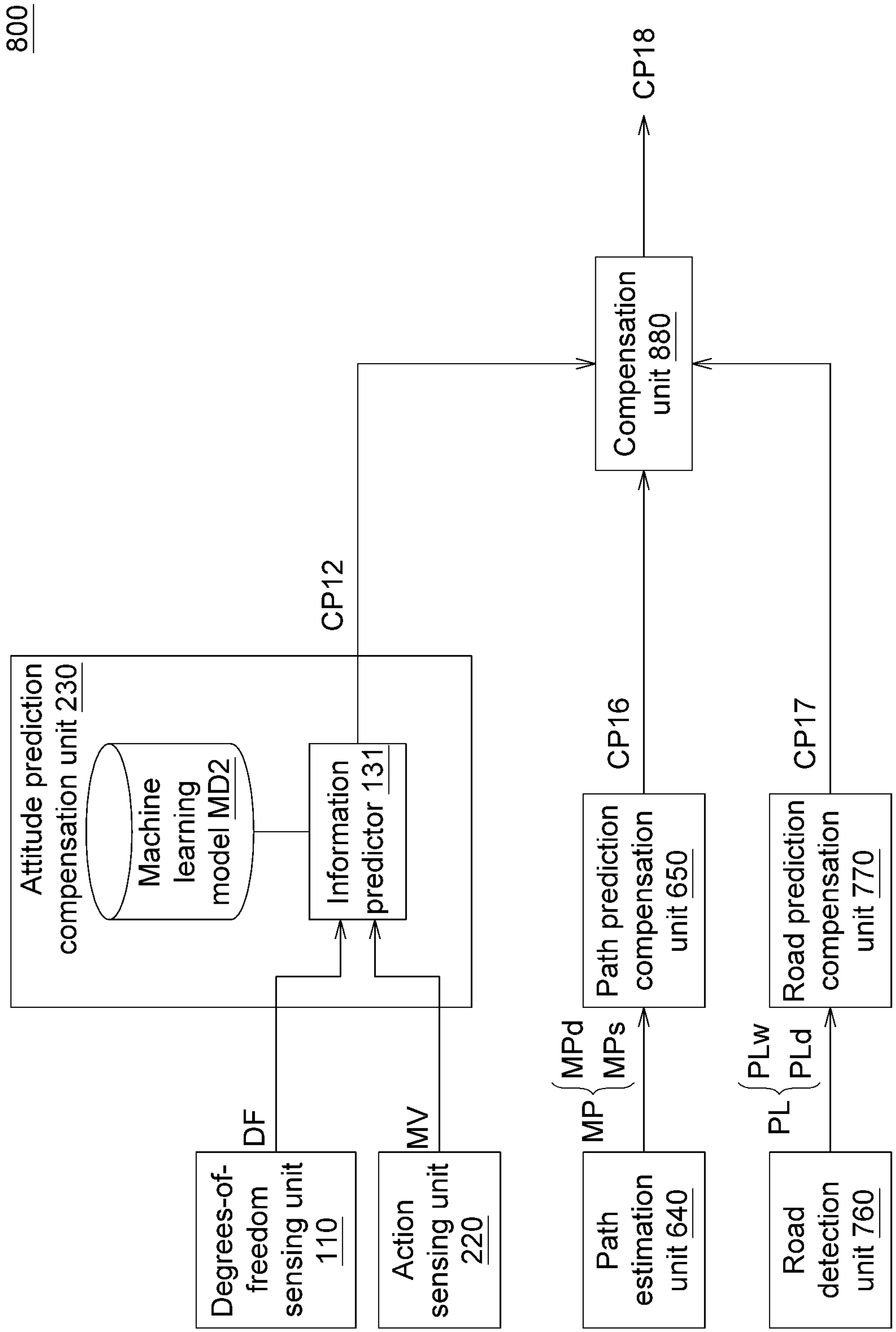
FIG. 12 is a block diagram of a system for compensating anti-dizziness predicted in advance according to another embodiment.

In each of the above embodiments, the display information DP can be compensated timely. In an embodiment, the technologies of the above embodiments can be integrated. Referring to FIG. 12, a block diagram of a system for compensating anti-dizziness predicted in advance 100 according to another embodiment is shown. In the embodiment of FIG. 12, the anti-dizziness compensation system 800 may include a degrees-of-freedom sensing unit 110, an action sensing unit 220, an attitude prediction compensation unit 230, a path estimation unit 640, a path prediction compensation unit 650, a road detection unit 760, a road prediction compensation unit 770 and a compensation unit 880. The degrees-of-freedom sensing unit 110 is configured to obtain a six-degrees-of-freedom information DF. The action sensing unit 220 is configured to obtain a mobile vehicle action information MV. The attitude prediction compensation unit 230 may include a machine learning model MD2 and an information predictor 131. Through using a machine learning model MD2, the information predictor 131 obtains an attitude prediction compensation information CP12 according to the six-degrees-of-freedom information DF. The path estimation unit 640 is configured to obtain a path information MP. The path prediction compensation unit 650 is configured to obtain a path prediction compensation information CP16 according to the path information MP. The road detection unit 760 is configured to obtain a road information PL. The road prediction compensation unit 770 is configured to obtain a road prediction compensation information CP17 according to the road information PL. The compensation unit 880 is configured to compensate the display information DP (illustrated in FIG. 1) according to the attitude prediction compensation information CP12, the path prediction compensation information CP16 or the road prediction compensation information CP17. For instance, the compensation unit 880 performs compensation according to formula (4).

$$\begin{aligned} X &= f_x*A_x+g_x*B_x+k_x*C_x \\ Y &= f_y*A_y+g_y*B_y+k_y*C_y \end{aligned} \tag{4}$$

Wherein X represents a horizontal compensation amount, $f_x$, $g_x$, $k_x$ represents a horizontal adjustment coefficient, Y represents a vertical compensation amount, $f_y$, $g_y$, $k_y$ represents a vertical adjustment coefficient. $f_x$, $f_y$ range between −3 and 3. $g_x$, $g_y$ range between −3 and 3. $k_x$, $k_y$ range between −1 and 1.

The horizontal compensation amount and the vertical compensation amount can form an integrative predictive compensation information CP18. Through the prediction procedure and the calculation procedure disclosed above, the integrative predictive compensation information CP18 can be estimated timely, so that the display information DP (illustrated in FIG. 1) can be compensated timely to enhance the anti-dizziness effect.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation to encompass all such modifications and similar arrangements and procedures.

What is claimed is:

1. A method for compensating anti-dizziness predicted in advance, wherein the method is adaptable to a mobile vehicle and comprises:

obtaining a six-degrees-of-freedom information;

through using a machine learning model, obtaining an attitude prediction compensation information according to the six-degrees-of-freedom information;

obtaining a path information including a travelling direction information and an uphill-and-downhill information;

obtaining a path prediction compensation information according to the path information;

obtaining a road information;

obtaining a road prediction compensation information according to the road information; and compensating a display information according to the attitude prediction compensation information, the path prediction compensation information or the road prediction compensation information;

wherein obtaining the path prediction compensation information comprises:

calculating a horizontal compensation information according to a travelling speed information and the travelling direction information; and calculating a vertical compensation information according to the travelling speed information and the uphill-and-downhill information.

2. The method for compensating anti-dizziness predicted in advance according to claim 1, wherein the six-degrees-of-freedom information is obtained from a plurality of past time points, and the attitude prediction compensation information corresponds to single future time point.

3. The method for compensating anti-dizziness predicted in advance according to claim 1, further comprising:

obtaining a mobile vehicle action information, wherein the six-degrees-of-freedom information and the mobile vehicle action information both are inputted to the machine learning model to obtain the attitude prediction compensation information.

4. The method for compensating anti-dizziness predicted in advance according to claim 3, wherein the mobile vehicle action information comprises a brake hitting information, a travelling speed and an accelerator hitting information.

5. The method for compensating anti-dizziness predicted in advance according to claim 3, wherein the step of obtaining the attitude prediction compensation information comprises:

through using the machine learning model, obtaining the six-degrees-of-freedom information at a future time point and the mobile vehicle action information at the future time point according to the six-degrees-of-freedom information at a past time point and the mobile vehicle action information at the past time point; and calculating the attitude prediction compensation information according to the six-degrees-of-freedom information at the future time point and the mobile vehicle action information at the future time point.

6. The method for compensating anti-dizziness predicted in advance according to claim 1, wherein the step of obtaining the attitude prediction compensation information comprises:

obtaining a system delay information; and switching the machine learning model according to the system delay information.

7. The method for compensating anti-dizziness predicted in advance according to claim 1, wherein the step of obtaining the attitude prediction compensation information comprises:

obtaining a system delay information;

switching the machine learning model according to the system delay information;

through using the machine learning model, obtaining the six-degrees-of-freedom information at a future time point and the mobile vehicle action information at the future time point according to the six-degrees-of-freedom information at a past time point and a mobile vehicle action information at the past time point; and calculating the attitude prediction compensation information according to the six-degrees-of-freedom information at the future time point and the mobile vehicle action information at the future time point.

8. The method for compensating anti-dizziness predicted in advance according to claim 1, wherein the road information comprises a pothole width information and a pothole depth information.

9. A system for compensating anti-dizziness predicted in advance, which is adaptable to a mobile vehicle, comprising:

a degrees-of-freedom sensing unit, configured to obtain a six-degrees-of-freedom information;

an attitude prediction compensation unit, comprising:

at least one machine learning model; and an information predictor, configured to, through using of the machine learning model, obtain an attitude prediction compensation information according to the six-degrees-of-freedom information;

a path estimation unit, configured to obtain a path information including a travelling direction information and an uphill-and-downhill information;

a path prediction compensation unit, configured to obtain a path prediction compensation information according to the path information;

a road detection unit, configured to obtain a road information;

a road prediction compensation unit, configured to obtain a road prediction compensation information according to the road information; and a compensation unit, configured to compensate a display information according to the attitude prediction compensation information, the path prediction compensation information or the road prediction compensation information;

wherein the path prediction compensation unit comprises:

a horizontal compensation calculator, configured to calculate a horizontal compensation information according to a travelling speed information and the travelling direction information; and a vertical compensation calculator, configured to calculate a vertical compensation information according to the travelling speed information and the uphill-and-downhill information.

10. The system for compensating anti-dizziness predicted in advance according to claim 9, wherein the six-degrees-of-freedom information is obtained from a plurality of past time points, and the attitude prediction compensation information corresponds to single future time point.

11. The system for compensating anti-dizziness predicted in advance according to claim 9, further comprising:

an action sensing unit, configured to obtain a mobile vehicle action information, wherein through using the machine learning model, the information predictor obtains an attitude prediction compensation information according to the six-degrees-of-freedom information and the mobile vehicle action information.

12. The system for compensating anti-dizziness predicted in advance according to claim 11, wherein the mobile vehicle action information comprises a brake hitting information, a travelling speed information and an accelerator hitting information.

13. The system for compensating anti-dizziness predicted in advance according to claim 11, wherein through using the machine learning model, the information predictor obtains the six-degrees-of-freedom information at a future time point and the mobile vehicle action information at the future time point according to the six-degrees-of-freedom information at a past time point and the mobile vehicle action information at the past time point, and the attitude prediction compensation unit further comprises:

a compensation calculator, configured to calculate the attitude prediction compensation information according to the six-degrees-of-freedom information at the future time point and the mobile vehicle action information at the future time point.

14. The system for compensating anti-dizziness predicted in advance according to claim 9, wherein the attitude prediction compensation unit further comprises:

a delay analyzer, configured to obtain a system delay information; and a model switcher, configured to switch the machine learning model according to the system delay information.

15. The system for compensating anti-dizziness predicted in advance according to claim 9, wherein the attitude prediction compensation unit comprises:

a delay analyzer, configured to obtain a system delay information;

a model switcher, configured to switch the machine learning model according to the system delay information, wherein through using the machine learning model, the information predictor obtains the six-degrees-of-freedom information at a future time point and the mobile vehicle action information at the future time point according to the six-degrees-of-freedom information at a past time point and the mobile vehicle action information at the past time point; and a compensation calculator, configured to calculate the attitude prediction compensation information according to the six-degrees-of-freedom information at the future time point and the mobile vehicle action information at the future time point.

16. The system for compensating anti-dizziness predicted in advance according to claim 9, wherein the road information comprises a pothole width information and a pothole depth information.

* * * * *